US010738833B2

(12) United States Patent
Cymbal et al.

(10) Patent No.: US 10,738,833 B2
(45) Date of Patent: Aug. 11, 2020

(54) YOKE TO SHAFT ATTACHMENT ASSEMBLY

(71) Applicant: Steering Solutions IP Holding Corporation, Saginaw, MI (US)

(72) Inventors: William D. Cymbal, Freeland, MI (US); Alan G. Turek, Mayville, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 440 days.

(21) Appl. No.: 15/637,795

(22) Filed: Jun. 29, 2017

(65) Prior Publication Data

US 2019/0002011 A1 Jan. 3, 2019

(51) Int. Cl.

*F16D 3/38* (2006.01)
*F16D 1/116* (2006.01)

(52) U.S. Cl.

CPC .............. *F16D 3/387* (2013.01); *F16D 1/116* (2013.01)

(58) Field of Classification Search

CPC .. B62D 1/16; B62D 1/185; B62D 1/20; F16B 2/065; F16C 3/02; F16C 2226/60; F16C 2226/62; F16C 2226/76; F16C 2226/80; F16C 2326/05; F16C 2326/24; F16D 1/116; F16D 3/382; F16D 3/387; F16D 2001/103; Y10T 403/4614; Y10T 403/4617; Y10T 403/7182; Y10T 403/7188

USPC ........ 403/235, 236, 398, 399; 464/134, 135, 464/905

See application file for complete search history.

(56) References Cited

U.S. PATENT DOCUMENTS

| | | | | |
|---|---|---|---|---|
| 4,171,822 A * | 10/1979 | Thun | B62M 1/36 | 74/594.1 |
| 4,576,504 A * | 3/1986 | Hartman | F16B 3/00 | 403/318 |
| 4,579,477 A * | 4/1986 | Hartman | F16B 3/00 | 403/324 |
| 4,862,760 A * | 9/1989 | Kuwahara | B60K 20/02 | 74/473.3 |
| 5,253,949 A * | 10/1993 | Oxley | B62D 1/16 | 403/155 |
| 5,580,184 A * | 12/1996 | Riccitelli | F16D 3/387 | 280/779 |
| 6,443,650 B2 | 9/2002 | Ikeda | | |
| 6,619,878 B2 * | 9/2003 | Wang | F16B 2/18 | 403/374.3 |
| 7,513,709 B2 * | 4/2009 | Shimada | F16D 3/387 | 403/236 |
| 7,517,284 B2 * | 4/2009 | Sekine | F16D 3/387 | 464/134 |

(Continued)

FOREIGN PATENT DOCUMENTS

| | | | |
|---|---|---|---|
| DE | 29612601 U1 * | 10/1996 | F16D 3/387 |
| DE | 102015201542 A1 * | 8/2016 | F16D 3/387 |
| FR | 2858289 A1 * | 2/2005 | F16D 3/387 |

*Primary Examiner* — Josh Skroupa

(74) *Attorney, Agent, or Firm* — Dickinson Wright PLLC

(57) ABSTRACT

A shaft assembly includes a yoke. The yoke defines a first bore and a second bore. The first bore extends from a first face towards a second face along a first axis. The first bore has a key that extends towards the first axis. The second bore extends from a third face towards a fourth face along a second axis that is disposed transverse to the first axis. The third face and the fourth face each extend between the first face and the second face.

15 Claims, 6 Drawing Sheets

(56) References Cited

U.S. PATENT DOCUMENTS

| | | | | |
|---|---|---|---|---|
| 7,604,428 | B2 * | 10/2009 | Castellon | F16D 3/387 403/289 |
| 8,235,420 | B2 * | 8/2012 | Moriyama | F16D 3/387 403/235 |
| 8,845,438 | B2 * | 9/2014 | Moriyama | F16D 3/387 403/236 |
| 9,205,859 | B2 * | 12/2015 | Tinnin | F16D 3/387 |
| 9,206,852 | B2 * | 12/2015 | Kaphengst | F16D 3/387 |
| 9,290,198 | B2 * | 3/2016 | Doerr | F16D 3/387 |
| 9,581,205 | B2 * | 2/2017 | Knoth | F16D 1/0864 |
| 9,863,479 | B2 * | 1/2018 | Mottier | F16D 3/387 |
| 10,315,685 | B2 * | 6/2019 | Assmann | F16D 3/387 |

* cited by examiner

YOKE TO SHAFT ATTACHMENT ASSEMBLY

BACKGROUND

A vehicle may be provided with a steering column having a clamp yoke that aids in the transmission of steering torque to a steering mechanism of the vehicle. A bolt may be inserted into the clamp yoke that applies a force to the clamp yoke to deform the clamp yoke to operatively connect the clamp yoke to a steering shaft or pinion shaft.

Accordingly, it is desirable to provide a reliable connection between the clamp yoke and the steering shaft or pinion shaft.

SUMMARY

According to an embodiment of the present disclosure, a shaft assembly is provided. The shaft assembly includes a yoke. The yoke defines a first bore and a second bore. The first bore extends from a first face towards a second face along a first axis. The first bore has a key that extends towards the first axis. The second bore extends from a third face towards a fourth face along a second axis that is disposed transverse to the first axis. The third face and the fourth face each extend between the first face and the second face.

According to another embodiment of the present disclosure, a shaft assembly is provided. The shaft assembly includes a yoke and a shaft. The yoke has a first face, a second face disposed opposite the first face, a third face extending between the first face and the second face, and a fourth face disposed opposite the third face and extending between the first face and the second face. The yoke defines a first bore having a key that extends from the first face towards the second face along a first axis. The shaft is at least partially received within the first bore. The shaft defines a key way that extends from a first shaft end towards a second shaft end along the first axis. The key way is arranged to at least partially receive the key.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
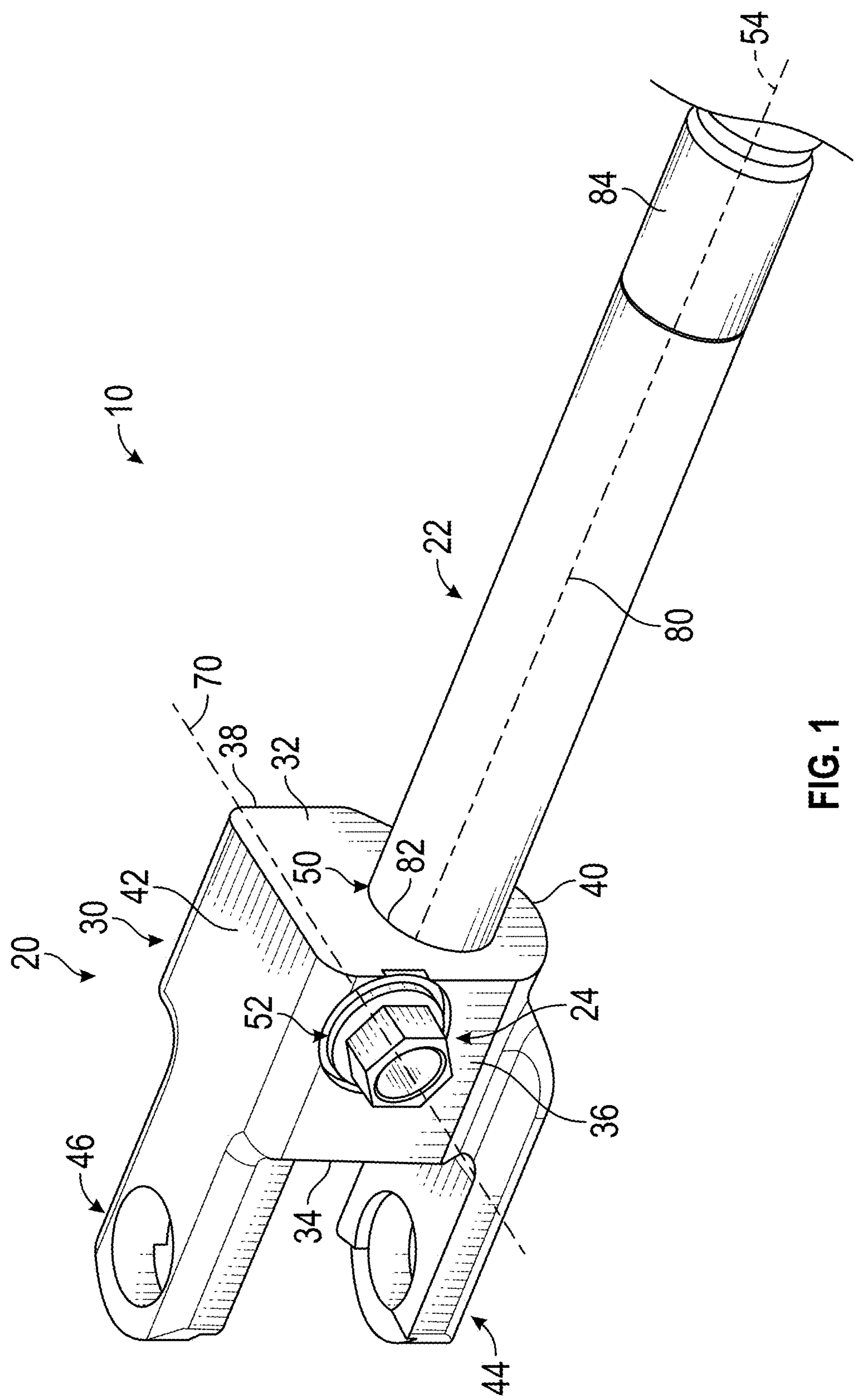
FIG. 1 is a perspective view of a shaft assembly.

Referring to FIG. 1, a shaft assembly 10 is shown. The shaft assembly 10 may be provided as part of a steering assembly and connects a steering wheel to a steering mechanism for steering gear. The shaft assembly 10 includes a yoke 20, a shaft 22, and a fastener assembly 24. The yoke 20 is secured to the shaft assembly 10 by the fastener assembly 24 that provides an improved yoke to shaft attachment assembly.

Figure 2:
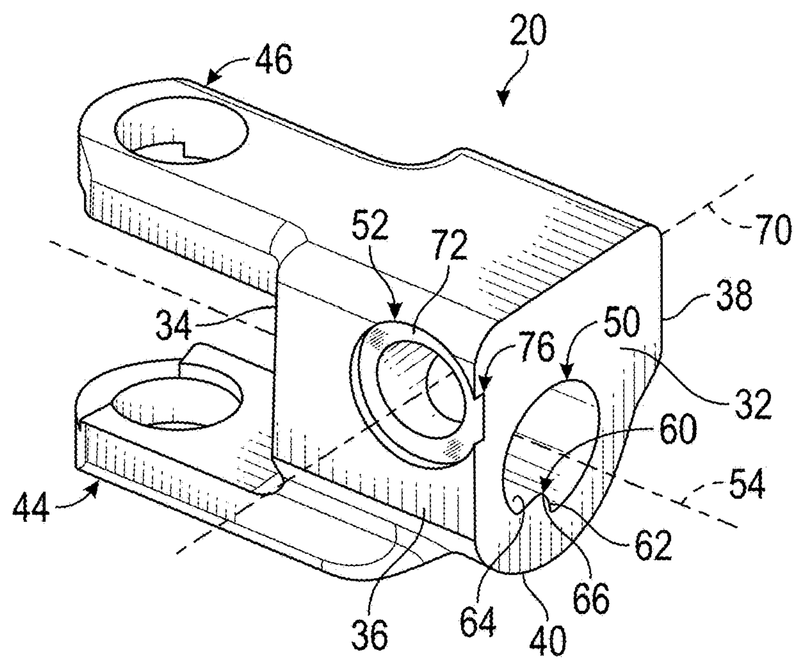
FIG. 2 is a perspective view of a yoke of the shaft assembly.

Referring to FIGS. 1 and 2, the yoke 20 includes a first face 32, a second face 34, a third face 36, a fourth face 38, a fifth face 40, and a sixth face 42. The second face 34 is disposed substantially parallel to and is disposed opposite the first face 32. The third face 36 extends between the first face 32 and the second face 34. The fourth face 38 is disposed opposite the third face 36 and extends between the first face 32 and the second face 34. The fifth face 40 extends between the first face 32, the second face 34, the third face 36, and the fourth face 38. The sixth face 42 is disposed opposite the fifth face 40 and extends between the first face 32, the second face 34, the third face 36, and the fourth face 38.

The yoke 20 further includes a first arm 44 and a second arm 46. The first arm 44 and the second arm 46 are spaced apart from each other and each extend away from the second face 34. The first arm 44 at least partially extends from the fifth face 40. The second arm 46 includes a surface that is disposed substantially parallel to the sixth face 42.

The yoke 20 defines a first bore 50 and a second bore 52. The first bore 50 extends from the first face 32 towards the second face 34 along a first axis 54. In at least one embodiment, the first bore 50 extends completely through the base of the yoke 20 such that the first bore 50 forms a through hole through the first face 32 and the second face 34.

The first bore 50 is provided with a key 60. The key 60 extends from a surface of the first bore 50 radially away from the fifth face 40 towards the first axis 54. The key 60 extends along a surface of the first bore 50 axially between the first face 32 and the second face 34. The key 60 includes a first key surface 62, a second key surface 64, and a third key surface 66. The third key surface 66 extends between the first key surface 62 and the second key surface 64.

Figure 5A:
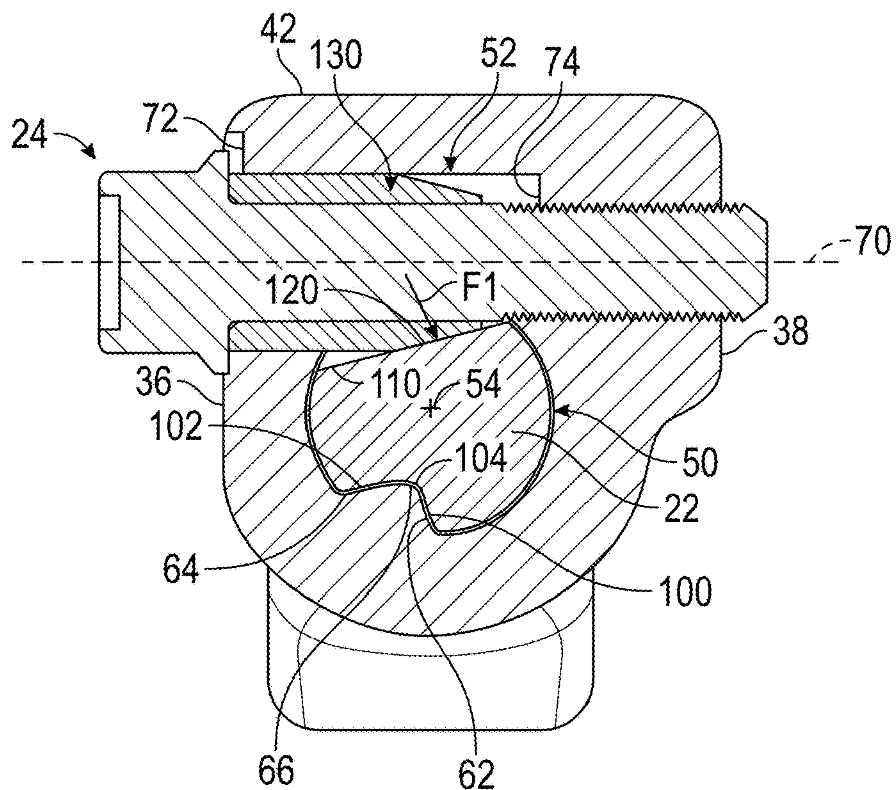
FIGS. 5A-5E are views of various embodiments of the fastener inserted into the clamp yoke.
Figure 5B:
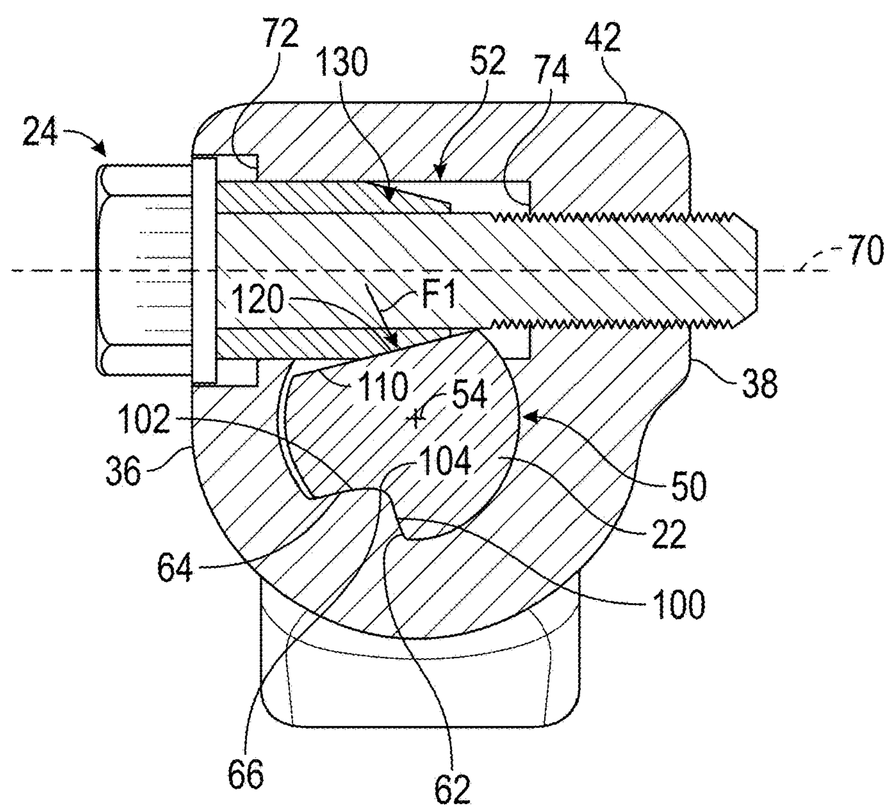

As shown in FIGS. 2, 5A, and 5B, the first key surface 62 and the second key surface 64 may become progressively closer to each other in a direction that extends from a surface of the first bore 50 towards the third key surface 56. As shown in FIG. 2 the first key surface 62 and the second key surface 64 have a substantially similar length. As shown in FIGS. 5A and 5B, the second key surface 64 may have a greater length than the first key surface 62. In such a configuration, the second key surface 64 as a tapered surface such that the key 60 is a tapered sided key.

Figure 5C:
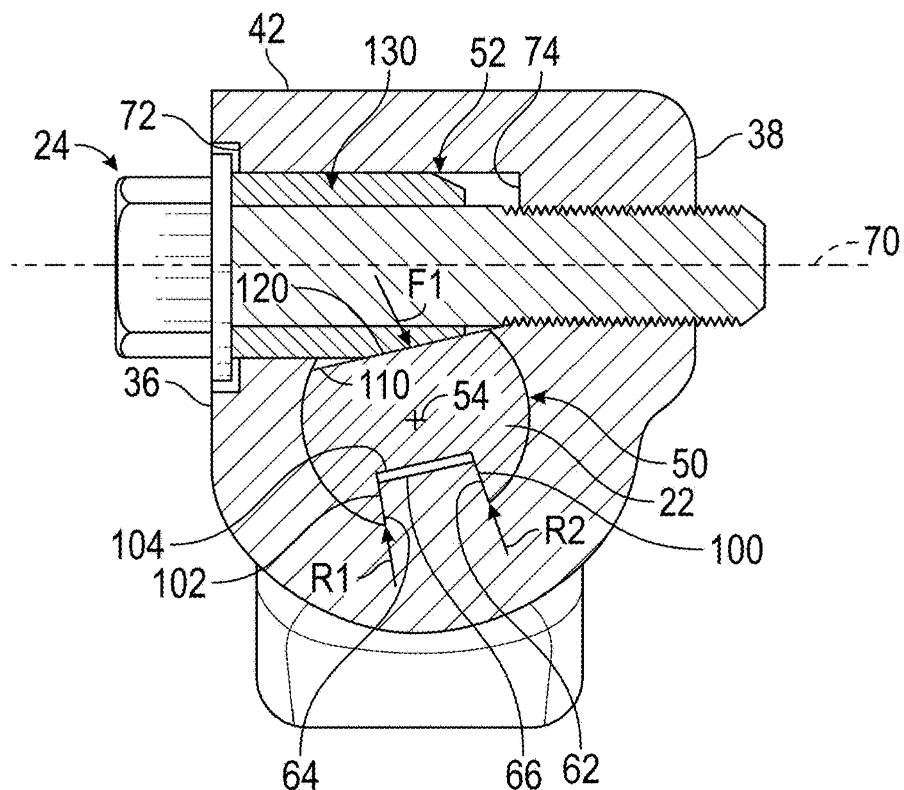
Figure 5D:
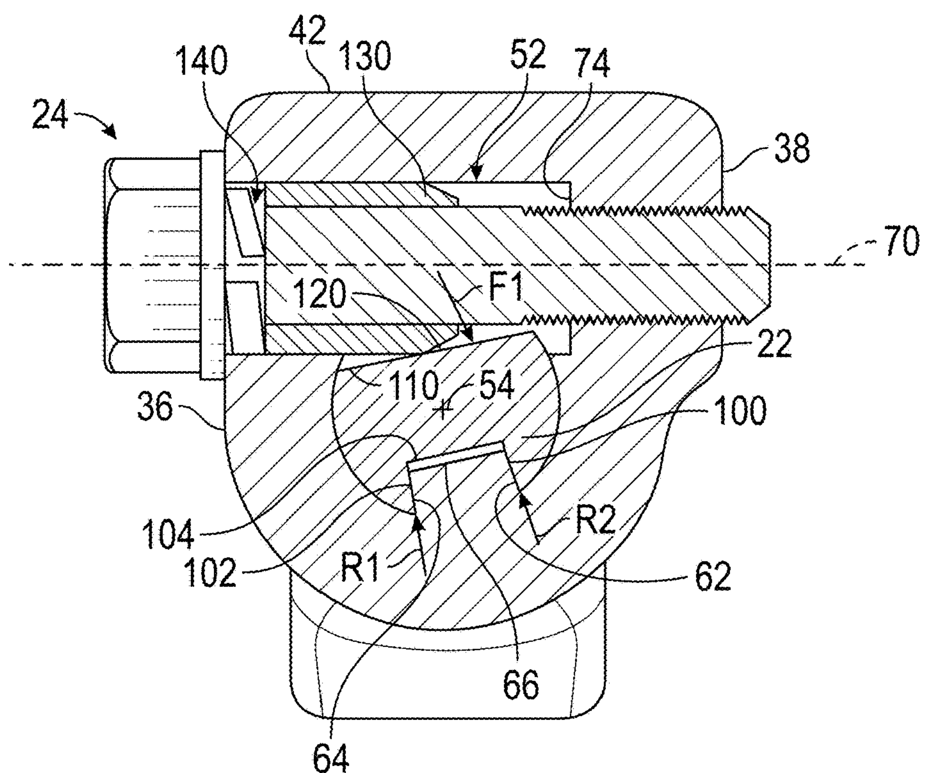
Figure 5E:
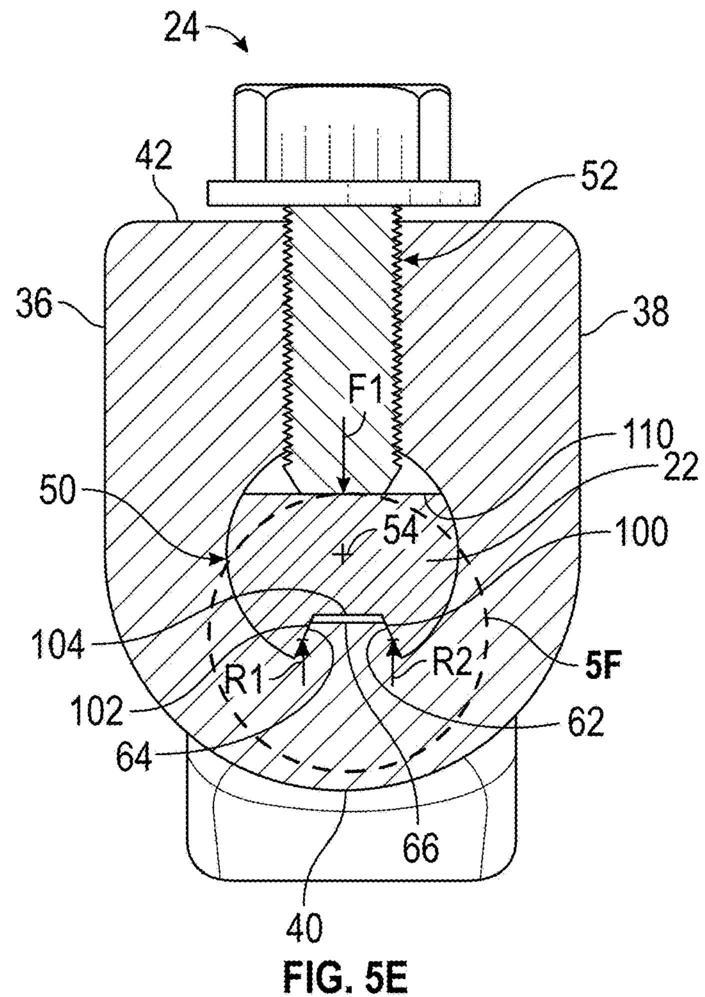
Figure 5F:
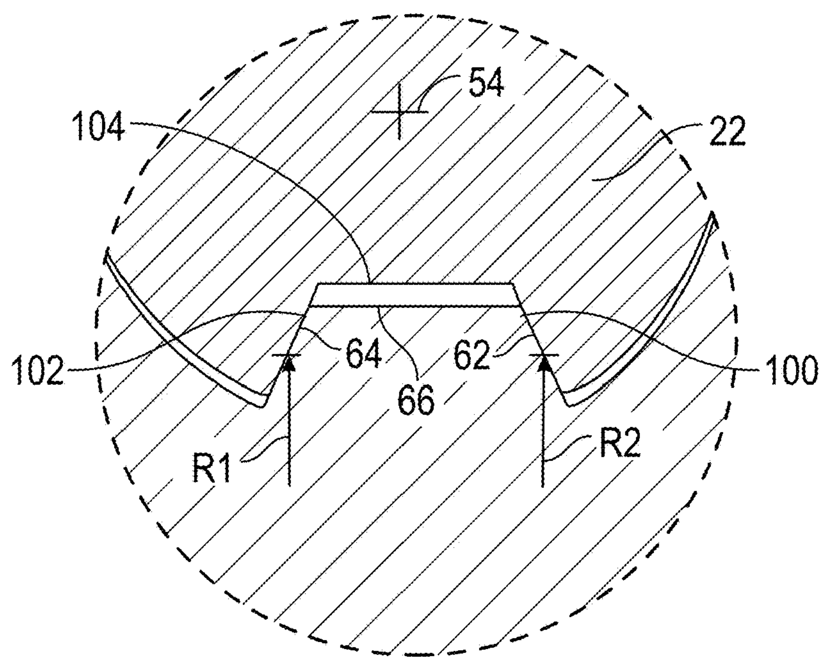
FIG. 5F is a view of a portion of the clamp yoke of 5E.

As shown in FIGS. 5C-5E, the first key surface 62 is disposed generally parallel to the second key surface 64. The third key surface 66 extends between and is disposed generally perpendicular to the first key surface 62 and the second key surface 64. In at least one embodiment, the third key surface 66 is angled or tapered such that the third key surface 66 is disposed in a nonparallel and non-perpendicular relationship with the third face 36 and the fourth face 38.

The second bore 52 extends from the third face 36 towards the fourth face 38 along a second axis 70 that is disposed transverse to the first axis 54. The second bore 52 includes a first counterbore 72 and a second counterbore 74 such that a diameter of the second bore 52 decreases from the third face 36 to the fourth face 38. The first counterbore 72 extends from the third face 36 towards the bore of the second bore 52. The second counterbore 74 extends from the second bore 52 towards the fourth face 38. In at least one embodiment, the yoke 20 defines a recess 76 that extends from the third face 36 towards the first counterbore 72. The recess 76 may at least partially extend into the first face 32.

Figure 3:
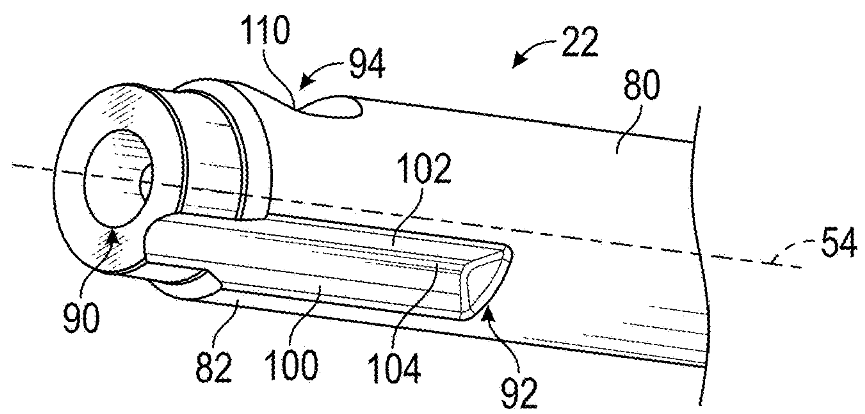
FIG. 3 is a perspective view of a portion of a shaft of the shaft assembly.
Figure 4:
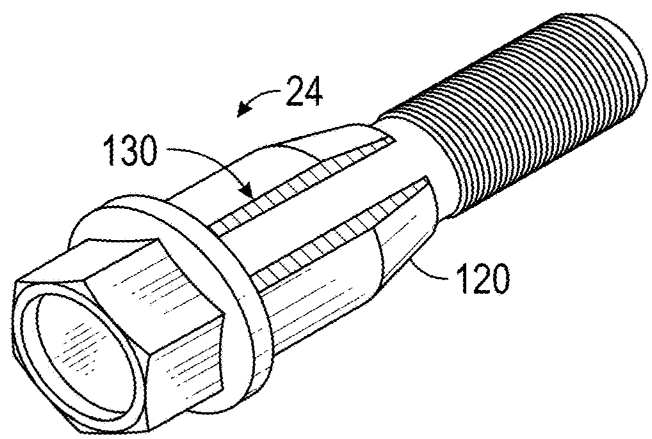
FIG. 4 is a perspective view of a fastener of the shaft assembly.

Referring to FIGS. 1 and 3, the shaft 22 is at least partially received within the first bore 50. The shaft 22 may be a pinion shaft that includes an outer surface 80 that extends between a first shaft end 82 and a second shaft end 84. The shaft 22 defines an opening 90, a key way 92, and a notch 94.

The opening 90 is disposed at the first shaft end 82 and extends from an end face of the opening 90 towards the second shaft end 84 along the first axis 54.

The key way 92 is arranged to at least partially received the key 60. The key way 92 axially extends from the first shaft end 82 towards the second shaft end 84 along the first axis 54. The key way 92 radially extends from the outer surface 80 towards the first axis 54.

The key way 92 includes a first surface 100, a second surface 102, and a third surface 104. The third surface 104 extends between the first surface 100 and the second surface 102. As shown in FIGS. 5B, 5C, and 5D, the first surface 100 engages the first key surface 62 and the second surface 102 engages the second key surface 64. As shown in FIG. 5B, the third surface 104 engages the third key surface 66. As shown in FIGS. 5C and 5D, the third surface 104 is spaced apart from the third key surface 66.

Referring to FIG. 3, the notch 94 is disposed proximate the first shaft end 82. The notch 94 radially extends from the outer surface 80 towards the first axis 54. The notch 94 axially extends along the first axis 54 between the first shaft end 82 and the second shaft end 84. The notch 94 extends across the shaft 22 in a direction that is transverse to the first axis 54. The notch 94 defines a surface 110 that is inclined or declined relative to the second axis 70 or is a tapered surface that tapers towards the first axis 54. The surface 110 is angled relative to a centerline of the key way 92. This angle may be within the range of 1° to 10°. In at least one embodiment, the notch 94 is inclined or declined relative to the second axis 70 or is a tapered surface that tapers towards the first axis 54 and/or may be angled relative to a centerline of the key way 92.

Referring to FIGS. 1, 4, and 5A-E, the fastener assembly 24 is at least partially received within the second bore 52 along the second axis 70. The fastener assembly 24 may include a tapered or conical surface 120 that engages the surface 110 of the notch 94. The tapered or conical surface 120 of the fastener assembly 24 is complementary or matches the angle of inclination of the surface 110 of the shaft 22. The tapered or conical surface 120 is tapered towards the second axis 70. The tapered or conical surface 120 contacts or engages the surface 110 of the shaft 22 when the fastener assembly 24 is inserted into the second bore 52. As shown in FIGS. 5A, 5B, and 5D, a sleeve 130 may be disposed about a shank of a fastener of the fastener assembly 24 and abuts the underside of the head of the fastener. The sleeve 130 may define the tapered or conical surface 120.

As the fastener assembly 24 is torqued, the force from the bolt torque causes the conical surface 122 apply a force, F1, to the surface 110 that forces the shaft 22 and the key way 92 towards the key 60 and forces or causes further engagement between the first key surface 62 and the first surface 100 and the second key surface 64 and the second surface 102. As shown in FIGS. 5A-5E, the force, F1, from the fastener assembly 24 leads to reaction forces between the first key surface 62 and the first surface 100, R1, and reaction forces between the second key surface 64 and the second surface 102, R2. These reaction forces renders the assembly of the shaft 22 with the yoke 20 substantially rigid in both torsion about the first axis 54 and bending moments relative to at least one of the first axis 54 and the second axis 70 applied to the shaft assembly 10.

Referring to FIG. 5D, a biasing member 140 may be disposed about a portion of the fastener assembly 24. The biasing member 140 may be disposed between an end of the sleeve 130 and a head of the fastener assembly 24. The biasing member 140 may be a high rate spring to aid in stretching the fastener assembly 24. With such a configuration, the biasing member 140 is disposed within the second bore 52 and the head of the fastener assembly 24 is seated against the third face 36 of the yoke 20.

Referring to 5E, the second bore 52 extends from the sixth face 42 towards the fifth face 40. The fastener assembly 24 is received within the second bore 52 and an end of the fastener assembly 24 engages the surface 110 of the shaft 22. In such a configuration, the surface 110 is disposed generally parallel to the first axis 54 and is disposed normal to the end of the fastener assembly 24. The force, F1, that is applied by the fastener assembly 24 to the surface 110 is a compression force that is normal to the reaction forces, R1, R2.

Figure 6A:
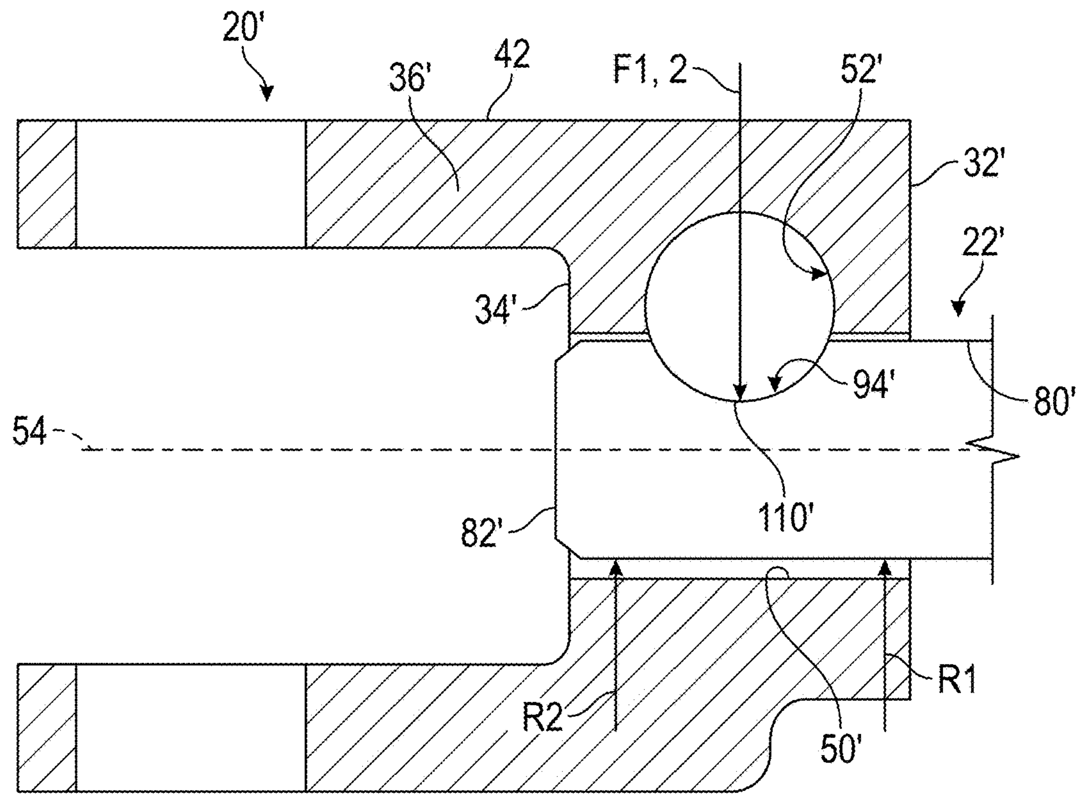
FIG. 6A is a cross-sectional view of a yoke and a shaft.
Figure 6B:
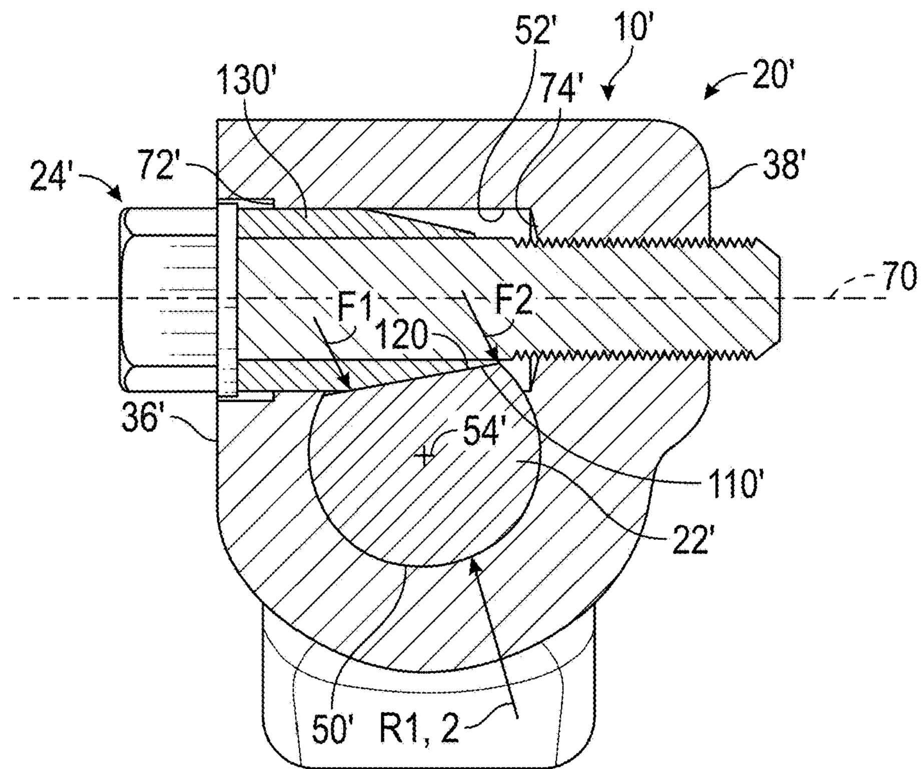
FIG. 6B is a cross-sectional view of a shaft assembly having the yoke and the shaft of FIG. 6A.

Referring to FIGS. 6A and 6B, an alternate embodiment of the shaft assembly 10' is shown. The shaft assembly 10' includes a yoke 20', a shaft 22', and a fastener assembly 24'.

The yoke 20' defines a first bore 50' that extends from a first face 32' towards a second face 34' that is disposed opposite the first face 32' along the first axis 54. The yoke 20' also defines a second bore 52' that extends from a third face 36' towards a fourth face 38' along the second axis 70 that is disposed transverse to the first axis 54. The second bore 52' includes a first counterbore 72' and a second counterbore 74' such that a diameter of the second bore 52' decreases from the third face 36' to the fourth face 38'. The first counterbore 72' extends from the third face 36' towards the bore of the second bore 52'. The second counterbore 74' extends from the second bore 52' towards the fourth face 38'.

The shaft 22' is at least partially received within the first bore 50'. The shaft 22' may be a pinion shaft that includes an outer surface 80' that extends between a first shaft end 82' and a second shaft end 84'. As shown in FIG. 6A, the first shaft end 82' may extend beyond the second face 34' in a direction that extends from the first face 32' towards the second face 34'.

The shaft 22' defines a notch 94' that is disposed proximate but is spaced apart from the first shaft end 82'. The notch 94' radially extends from the outer surface 80' towards the first axis 54. The notch 94' axially extends along the first axis 54 between the first shaft end 82' and the second shaft end 84'. The notch 94' extends across the shaft 22' in a direction that is transverse to the first axis 54. The notch 94' defines a surface 110' that is inclined or declined relative to the second axis 70 or is a tapered surface that tapers towards the first axis 54.

Referring to FIG. 6B, the fastener assembly 24' is at least partially received within the second bore 52' along the second axis 70. The fastener assembly 24' may include a tapered or conical surface 120' that engages the surface 110' of the notch 94'. The tapered or conical surface 120' of the fastener assembly 24' is complementary or matches the angle of inclination of the surface 110' of the shaft 22'. The tapered or conical surface 120' is tapered towards the second axis 70'. The tapered or conical surface 120' contacts or engages the surface 110' of the shaft 22' when the fastener assembly 24' is inserted into the second bore 52'.

A sleeve 130' may be disposed about a shank of a fastener of the fastener assembly 24 and abuts the underside of the head of the fastener. The sleeve 130' may have a larger diameter as compared to the sleeve 130. The sleeve 130' may define the tapered or conical surface 120'.

The tapered or conical surface 120' of the sleeve 130' makes contact with the angled surface 110' of the notch 94' when the fastener assembly 24' is inserted into the second bore 52'. As the fastener assembly 24 is tightened, the shaft 22' is allowed to rotate and align the tapered or conical surface 120' of the sleeve 130' with the angled surface 110' of the notch 94' and apply the forces F1 and F2 to the angled surface 110' of the notch 94'. As the forces F1 and F2 are applied, the shaft 22' engages or contacts a surface of the second bore 52' of the yoke 20' at R1, R2 and the reaction forces rotationally locate the shaft 22' to the yoke 20' when the fastener assembly 24' is installed.

While the present disclosure has been described in detail in connection with only a limited number of embodiments, it should be readily understood that the present disclosure is not limited to such disclosed embodiments. Rather, the present disclosure may be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or various combinations of elements of the described embodiments. Accordingly, the present disclosure is not to be seen as limited by the foregoing description.

Having thus described the present disclosure, it is claimed:

1. A shaft assembly, comprising:

a yoke defining a first bore that extends from a first face towards a second face along a first axis, and a second bore that extends from a third face towards a fourth face along a second axis that is disposed transverse to the first axis, the third face and the fourth face each extending between the first face and the second face;

a shaft having an outer surface extending from a first shaft end to a second shaft end along the first axis, the shaft defining a notch that is disposed proximate the first shaft end and extends from the outer surface towards the first axis, the notch including a surface that is angled relative to the second axis;

a fastener having a fastener head and a shank, the fastener at least partially received within the second bore; and a sleeve disposed about the shank and abutting the fastener head, wherein the sleeve engages the surface.

2. The shaft assembly of claim 1, wherein the first bore includes a key that extends towards the first axis, and the key extends along the first bore from the first face towards the second face.

3. The shaft assembly of claim 1, wherein the first bore includes a key that extends towards the first axis, the key includes a first key surface, a second key surface, and a third key surface extending between the first key surface and the second key surface.

4. The shaft assembly of claim 3, further comprising:

the shaft defining a key way that extends along the first axis from the first shaft end towards the second shaft end and extends from the outer surface towards the first axis, the key being at least partially received within the key way.

5. The shaft assembly of claim 4, wherein the key way includes a first surface, a second surface, and a third surface extending between the first surface and the second surface.

6. The shaft assembly of claim 5, wherein the first key surface engages the first surface and the second key surface engages the second surface.

7. The shaft assembly of claim 1, wherein the sleeve includes a tapered surface spaced from the fastener head that is tapered away from the fastener head and towards the second axis.

8. The shaft assembly of claim 1, wherein the second bore includes a first counterbore for accommodating the fastener head.

9. The shaft assembly of claim 8, wherein the second bore further includes a second counterbore for accommodating the sleeve.

10. The shaft assembly of claim 1, further comprising:

a biasing member that is disposed between the sleeve and the head of the fastener.

11. A shaft assembly, comprising:

a yoke having a first face, a second face disposed opposite the first face, a third face extending between the first face and the second face, and a fourth face disposed opposite the third face and extending between the first face and the second face, the yoke defining a first bore extending along a first axis and a second bore extending along a second axis transverse to the first axis;

a shaft that is at least partially received within the first bore, the shaft having an outer surface extending from a first shaft end to a second shaft end along the first axis, the shaft defining a notch including a surface that is angled relative to the second axis;

a fastener having a fastener head and a shank, the fastener at least partially received within the second bore; and a sleeve disposed about the shank and abutting the fastener head, wherein the sleeve engages the surface.

12. The shaft assembly of claim 11, wherein the notch extends across the shaft in a direction that is transverse to the first axis.

13. The shaft assembly of claim 12, wherein the second bore extends from the third face towards the fourth face.

14. The shaft assembly of claim 12, wherein the surface of the notch declines towards the first axis.

15. The shaft assembly of claim 14, wherein the sleeve includes a tapered surface spaced from the fastener head that is tapered away from the fastener head and towards the second axis.

* * * * *